Figure 1:
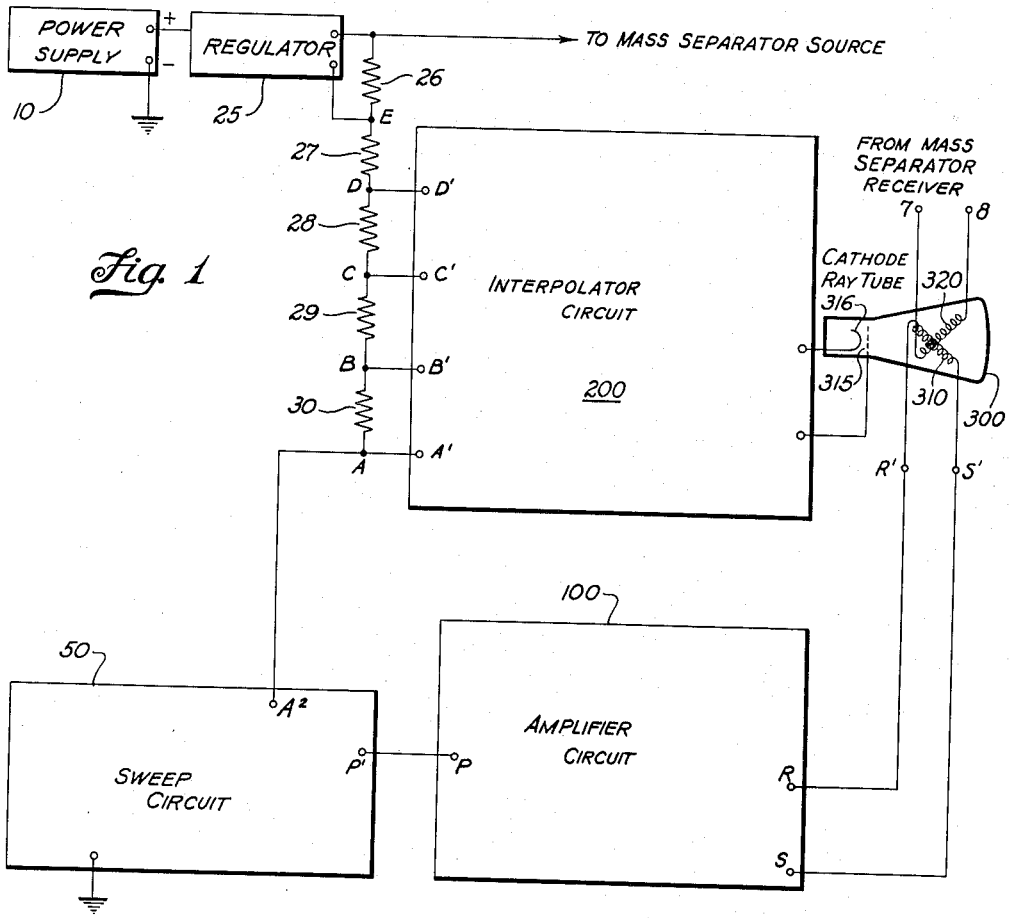

April 24, 1956

Q. A. KERNS 2,743,371

ELECTRONIC ANALYZER

Filed Jan. 28, 1949

3 Sheets-Sheet 1

INVENTOR.
QUENTIN A. KERNS
BY

ATTORNEY.

April 24, 1956     Q. A. KERNS     2,743,371
ELECTRONIC ANALYZER

Filed Jan. 28, 1949     3 Sheets-Sheet 2

INVENTOR.
QUENTIN A. KERNS
BY
*Roland A. Anderson*
ATTORNEY.

April 24, 1956

Q. A. KERNS 2,743,371

ELECTRONIC ANALYZER

Filed Jan. 28, 1949

3 Sheets-Sheet 3

INVENTOR.
QUENTIN A. KERNS
BY
Roland A. Anderson
ATTORNEY.

United States Patent Office 2,743,371
Patented Apr. 24, 1956

2,743,371

ELECTRONIC ANALYZER

Quentin A. Kerns, Berkeley, Calif., assignor to the United States of America as represented by the United States Atomic Energy Commission Application January 28, 1949, Serial No. 73,248

9 Claims. (Cl. 250—41.9)

This invention relates to an improvement in apparatus for determining the position of the beam of a mass separator with respect to the receiver thereof. More particularly, this invention relates to an improvement in monitoring apparatus of the type providing a graphic representation of the physical properties of an ion beam.

As a result of recent rapid advancements in the field of electromagnetic separation of isotopes, the new calutrons are capable of producing macroscopic quantities of matter, thereby proving themselves feasible not only for experimental purposes, but also for commercial purposes. In relation to the commercial application of calutrons, it is necessary that there be provided continuous operating information concerning the ion beam trajectory. Furthermore, this information must be instantly available in a simple usable form in order to enable personnel having a minimum of essential training to successfully operate the complex and expensive calutron.

The use of visual indicating means such as cathode ray tubes is highly advantageous in that the technical knowledge necessary to properly interpret the available information is measurably reduced. Heretofore, numerous meters were commonly utilized to provide the same information that is visually depicted by the present invention as a curve on a fluorescent screen. Even conventional visual control means require certain approximations by the operator for proper control of the calutron and, at best, result in a trial and error method of adjustment.

By the use of the present invention, however, these difficulties are obviated. The exact location of the ion beam with respect to the receiver is immediately apparent and the effect of any adjustments that are indicated as necessary may be viewed during the time that they are being made so that the possibility of incorrect adjustments owing either to inadvertence or misunderstanding is minimized.

It is therefore an object of this invention to provide an improved ion beam analyzer.

It is another object of this invention to provide orienting indicia upon the screen of a cathode ray tube.

It is yet another object of this invention to provide an improved means to orient the trace upon the fluorescent screen of a cathode ray tube in accordance with a characteristic of an electrical phenomenon depicted thereon.

It is a further object of this invention to provide an improved electrical means to intensify a desired portion of the trace upon the fluorescent screen of a cathode ray tube.

It is a still further object of this invention to provide an improved electronic means for protecting the screen of a cathode ray tube from overly large signals which may be impressed upon the tube during the course of operation.

It is a further object of this invention to provide an improved electrical circuit for controlling the intensity of the trace on the fluorescent screen of a cathode ray tube.

It is a further object of this invention to provide an improved electrical circuit in combination with an ion beam analyzer.

Figure 5:
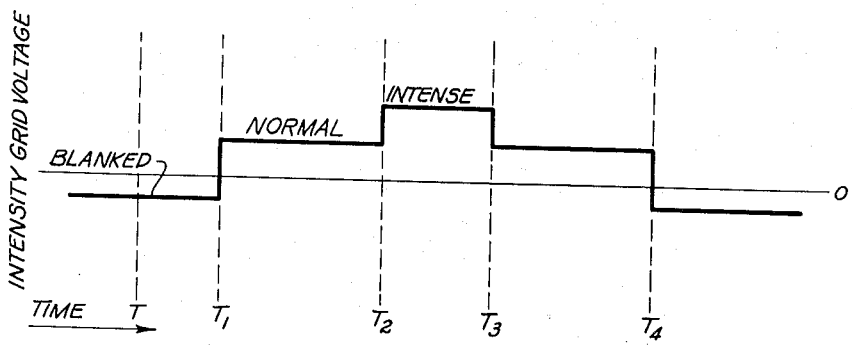
Figure 2:
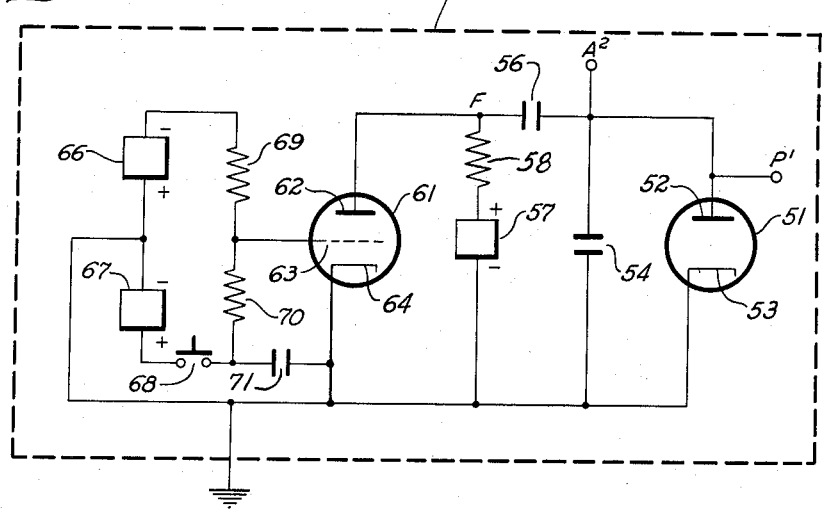
Figure 3:
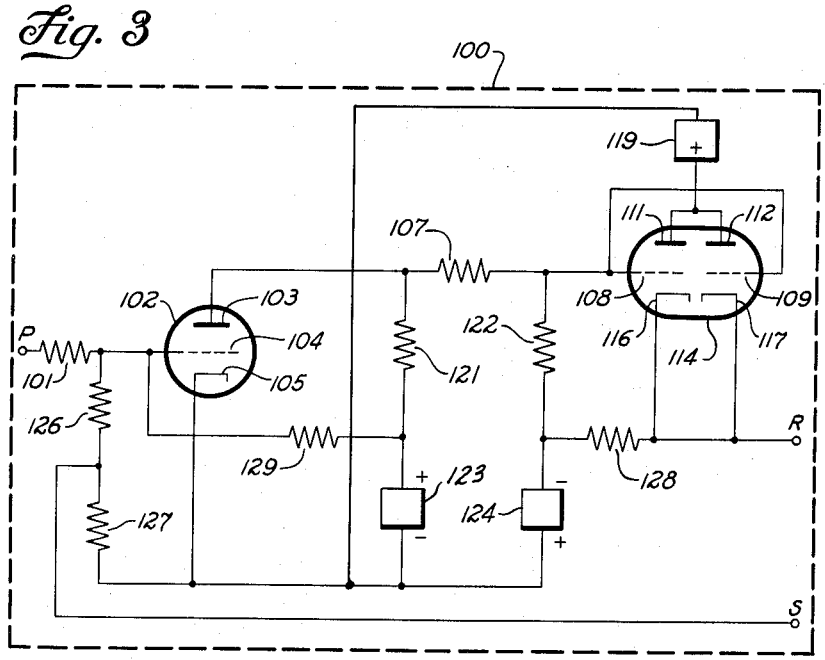
Figure 4:
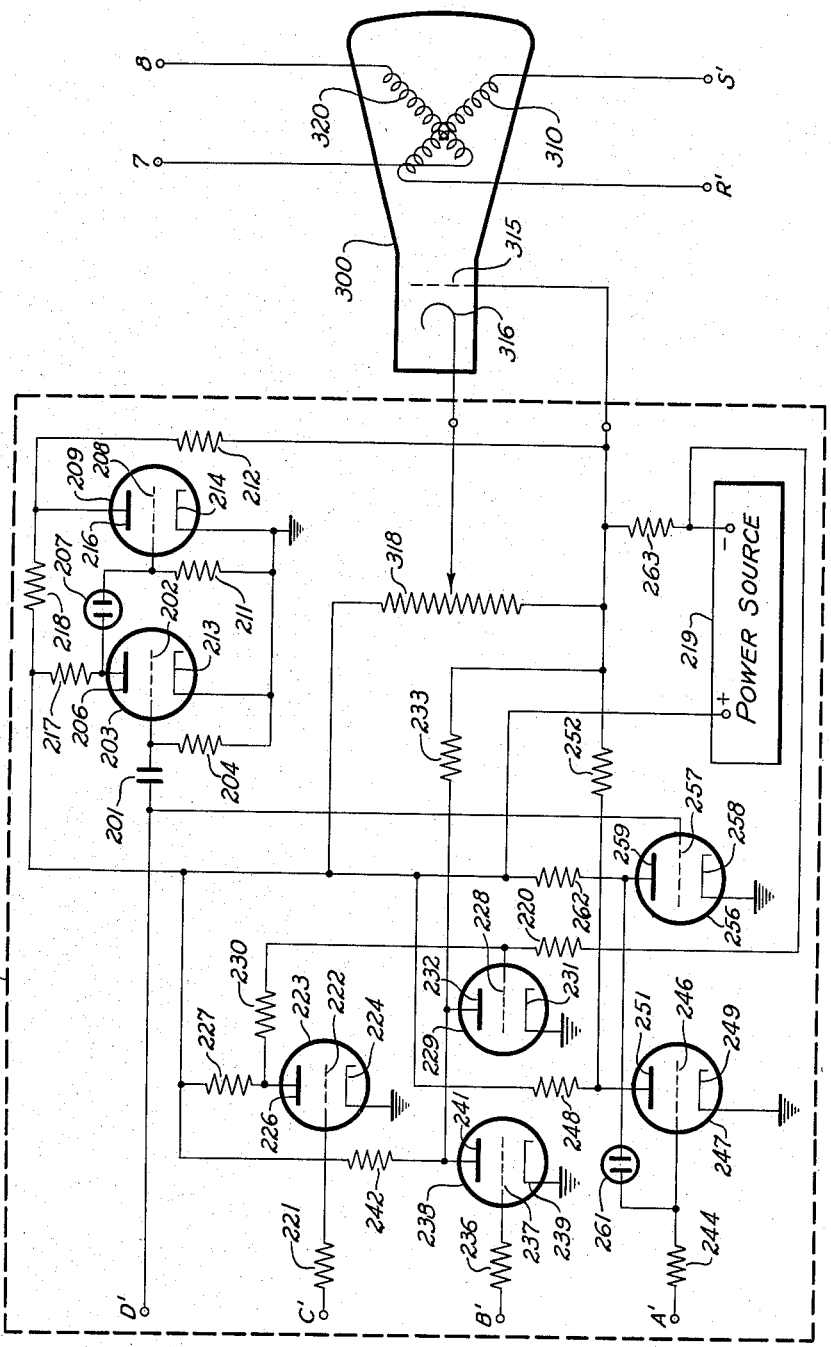

Further objects and advantages of the invention will become apparent to those familiar with the art upon a consideration of the following description and accompanying drawings, of which: Figure 1 is a block diagram of a preferred embodiment of the invention, Fig. 2 is an electrical diagram of the sweep circuit, Fig. 3 is an electrical diagram of the amplifier circuit, Fig. 4 is a diagram of the interpolator circuit and the cathode ray tube, and Fig. 5 is a graph of relative trace intensities over the period of one sweep.

It is to be noted that the ion beam analyzer of the present invention is adapted to cooperate with any type of electromagnetic mass separator. The following disclosure is referenced to a calutron as the calutron appears to have the greatest commercial applicability at the present time; however, no limitation upon the type of electromagnetic mass separator is intended and the present invention is equally adaptable to any apparatus generating or utilizing a beam of ions.

Electromagnetic mass separators conventionally utilize an ion source, a magnetic field into which ions are projected, and an ion receiver adapted to collect desired ions. In conjunction with the ion source there is usually provided accelerating means to remove ions from the source and project them into the magnetic field with an initial controlled velocity. These accelerating means commonly take the form of one or more accelerating electrodes positioned adjacent the ion source and maintained at a negative potential thereto, whereby an electric field is established in a direction to urge ions from the source. This electric field may be established by the application of a highly negative potential to the accelerating electrode and a substantially ground potential to the ion source, or by the application of a highly positive potential to the ion source and a substantially ground potential to the accelerating electrode, or a combination thereof. It will of course be appreciated that the present invention is adapted for use with an electromagnetic mass separator utilizing any of the above methods of ejecting ions from the source.

The particular electromagnetic mass separator set forth in the present disclosure in combination with the instant invention is a calutron utilizing substantially grounded accelerating electrodes and a highly positive ion source. Such a calutron is described in the application of Ernest O. Lawrence, Serial No. 557,784, filed October 9, 1944, now Patent No. 2,709,222, issued May 24, 1955, and since the precise structure thereof forms no essential part of this invention it is not shown in detail in the present case. As shown in Fig. 1, the positive high voltage applied to the conventional ion source (not shown) is provided by a conventional power supply 10 having means (not shown) to vary the output and regulated by a regulator 25 of conventional design. This highly positive regulated voltage is applied to the ion source, thereby establishing a strong electrostatic field between the ion source and accelerating electrodes. As will be obvious to those skilled in the art, this electrostatic field imparts an energy to the ions formed at the source and these ions are consequently ejected from the source with a known velocity. The ejected ions pass into a region traversed by a magnetic field which influences the ions to traverse arcuate paths. The particular paths of the ions depend upon their initial velocity, charge, and mass. The ions ejected from the ion source separate under the influence of the magnetic field into individual beams composed of ions of like mass-to-charge ratios. Thus, by controlling the initial velocity of the ions any desired beam of ions may be focused at the receiver (not shown) and collected to the exclusion of the remainder of the ions. Within practical limits the charge upon all ions is identical and thus only ions of a desired mass are collected at the receiver. However, owing to occasional drift or variation of operating potentials and characteristics it is necessary to continually check the trajectory of the ions and for this purpose the ion beam analyzer shown schematically on Fig. 1 is provided.

With the high voltage system as set forth above in mind, Fig. 1 depicts a grounded sweep circuit 50 which is connected through dividing resistors 28, 29 and 30 to a high resistance bleeder (resistors 26 and 27), connection being made to the regulator 25 from the point E on said bleeder. The output of the sweep circuit 50 is also applied through an amplifier 100 to the horizontal deflecting coils 310 of a cathode ray tube 300. Disposed across the voltage dividers (resistors 28, 29, and 30) is an interpolator circuit 200 the output of which controls the intensity grid 315 of the cathode ray tube 300, whose vertical deflection plates are energized from the calutron collector through lines 7 and 8. It is to be noted at this point that in the case of low power operation of the calutron wherein the current from the collector is quite small, the signal from the collector pocket may be amplified by suitable amplification means to the point where satisfactory operation of the cathode ray tube 300 is realized. It is to be appreciated that the following points are electrically identical; D and D'; C and C'; B and B'; and P and P'; and A, A', A²; this system of identification being adopted merely for ease of identification in the following description.

In order to facilitate a detailed description of the component circuits and their operation, a brief summary of the general operation of the analyzer as a whole and its manner of cooperation with an electromagnetic separator is set forth below.

The present analyzer operates to impress a sweep voltage upon the ion accelerating voltage, thereby varying the ion trajectory. It has been found advantageous to vary the ion accelerating voltage in only one direction from the voltage which focuses the desired beam of ions at the receiver. This results in the beam of ions of the desired mass being swept away from the receiver during the short periods of analyzer operation. Thus in order to obtain an indication at the receiver during operation of the analyzer the value of the sweep voltage which is impressed upon the ion accelerating voltage is so chosen that ions of another known mass are instantaneously focused at the receiver during the sweep.

The amount of the sweep voltage which when impressed upon the original ion accelerating voltage will focus the other beam of ions at the receiver is determined. The values of the resistors comprising the voltage divider are then chosen so that when the sweep voltage passes through this value the intensity grid of the cathode ray tube is influenced by the interpolator circuit 200 to intensify the trace on the fluorescent screen. Thus if the original ion accelerating voltage is proper for ions of the desired mass to be focused at the receiver, the peak traced on the screen as a result of the other ion beam being swept across the receiver should be intensified. However if some portion of the trace other than the peak is intensified, the original constant ion accelerating voltage is improperly adjusted and must be corrected so that the analyzer does indicate a correspondence between the peak and the brilliant portion of the trace on the fluorescent screen.

The above discussion may be further illustrated by considering a convenient hypothetical example (no reference being intended to the element ruthenium). Take for instance the case of ions of an isotope having an atomic weight of 100 being collected at the receiver of an electromagnetic separator with the ion accelerating voltage properly adjusted to accomplish this collection. Further assume that the material from which this isotope is being separated has another isotope of atomic weight 103 which will also be ionized at the source and projected toward the receiver, however traversing a larger orbit owing to the greater mass of the ions. A decrease in ion accelerating voltage is necessary to focus the heavier ions at the receiver and, knowing the constants of the particular electromagnetic separation in use, this decrease may be calculated. The ion accelerating potential is often referred to in terms of its effect upon the ions rather than in volts, and thus the potential variation necessary to focus ions three mass units heavier at the receiver may be considered three mass units of potential. If, for example, the calculated ion accelerating voltage decrease were 600 volts, the sweep voltage could be set at approximately 1200 volts. Thus actuation of the sweep voltage would sweep the beam of ions of the heavier isotope across the receiver, and as the sweep voltage is also applied to the horizontal deflection plates of the cathode ray tube, the peak from the beam of heavy ions entering the receiver will appear at approximately the center of the fluorescent screen. A portion of the trace on the fluorescent screen corresponding to 550 to 650 volts of the sweep voltage is intensified by means of the interpolator circuit connected across resistors 28, 29, and 30 as hereinafter described. Thus in operation of the analyzer in the example set forth above any nonconformity between the peak traced on the screen and the brilliant portion of the trace indicates an improperly adjusted ion accelerating voltage which may be corrected by varying the ion accelerating voltage until the peak is exactly centered in the middle of the brilliant portion of the trace.

Proceeding with a description of the component circuits herein combined, and referring in particular to the sweep circuit 50 as shown in Fig. 2, it is to be noted that point A² is grounded through a condenser 54 and also through a diode vacuum tube 51, the plate 52 of said tube being tied to point A² and the cathode 53 being grounded. A power supply 57, the negative side of which is grounded, has its positive terminal connected through a plate resistor 58 to a point F which in turn is connected through a condenser 56 to point A² and is directly connected to the plate 62 of a triode vacuum tube 61. The negative side of a power supply 66 is connected through resistor 69 to the control grid 63 of the triode vaccum tube 61; and the positive side of a power supply 67 is connected through a push button switch 68 to a resistor 70 which in turn is connected to the control grid 63 of the triode vacuum tube 61. The cathode 64 of tube 61 is connected through condenser 71 to the load side of the push button switch 68, and the two power supplies 66 and 67 are joined to a common ground.

Following the sweep circuit 50, hereinabove described, is an amplifier unit 100 which produces from the sweep circuit voltage a current of sufficient strength to operate the horizontal deflection coils 310 of the cathode ray tube 300. The amplifier 100, as depicted in Fig. 3, consists of two vacuum tubes 102 and 114 directly coupled by a resistance bridge composed of resistances 107, 121 and 122. The sweep circuit signal is applied through resistor 101 to the grid 104 of tube 102 and thence from the plate 103 of said tube through the resistance bridge as above described to the grids 108 and 109 of twin triode vacuum tube 114. The cathodes 116 and 117 of tube 114 are joined and connected to the horizontal deflection coils 310 of the cathode ray tube 300 from which there is provided a negative feedback return connected to the junction of resistors 126 and 127, the opposite end of resistor 127 being at substantially ground potential and the opposite end of resistor 126 being tied to the grid 104 of tube 102. Two power supplies 123 and 124 are provided, the first of which has its positive terminal connected to the resistance bridge coupling at resistor 121, and to the grid 104 of tube 102 through resistor 129; the other power supply having its negative terminal connected to the resistance bridge coupling at resistance 122 and to the cathodes 116 and 117 of tube 114 through a resistance 128. Power supplies 123 and 124 are joined directly in a common ground and tied to the cathode 105 of tube 102. The plates 111 and 112 of tube 114 are maintained at a positive potential by a power supply 119.

With reference to a further circuit herein employed, Fig. 4 depicts the interpolation circuit 200 and cathode ray tube 300. Point D' is connected through a condenser 201 to the grid 202 of a vacuum tube 203, a biasing resistor 204 being inserted ahead of said grid. The output of tube 203 is applied from its plate 206 through a neon coupling tube 207 to the grid 208 of tube 209, a biasing resistor 211 also being inserted ahead of this grid. The output of tube 209 is impressed upon the intensity grid 315 of the cathode ray tube 300 through a resistor 212. The cathodes 213 and 214 of tubes 203 and 209 respectively are grounded and the plates 206 and 216 of these tubes are connected through resistors 217 and 218 respectively to a suitable plate power supply 219. Point C' is connected through a resistor 221 to the grid 222 of a vacuum tube 223 whose cathode 224 is grounded and whose plate supply is obtained from a power supply 219 through resistor 227. The plate 226 of tube 223 is connected through a resistor 230 to the grid 228 of a triode vacuum tube 229, said grid 228 being negatively biased from a power supply 219 through a resistor 220. Vacuum tube 229 has its cathode 231 grounded and plate 232 connected through a resistor 233 to the intensity grid 315 of the cathode ray tube 300. Point B' is joined through a resistor 236 to the grid 237 of a vacuum tube 238, the cathode 239 of which is grounded. The plate 241 is directly attached to the plate 232 of tube 229, and thus to the cathode ray tube intensity grid 315 through resistor 233, while the plate potential of tube 238 is maintained by a power supply 219 through a resistor 242. Point A' is connected through a resistor 244 to the grid 246 of a triode vacuum tube 247. The plate supply of this tube is obtained from a power supply 219 through a resistor 248 and the cathode 249 is grounded. The plate 251 of tube 247 is joined through a resistor 252 to the cathode ray tube intensity grid 315. Another vacuum tube 256 is provided having its grid 257 directly connected to point D', its cathode 258 grounded, its plate 259 linked to the grid 246 of tube 247 through a neon tube 261, and its plate potential maintained by a power supply 219 through a resistor 262. The intensity grid 315 is further connected through a resistor 263 to the negative terminal of the power supply 219, and the filament 316 of the cathode ray tube 300 is heated from the power supply 219 through a variable resistance 318.

By way of obtaining an over-all picture of the operation of the invention, it may be noted that the voltage generated by the sweep circuit 50 is applied to the amplifier circuit 100 wherein a current is produced from the sweep voltage, said current being of sufficient amplitude to energize the horizontal deflecting coils 310 of a cathode ray tube 300. The sweep voltage also produces an equal voltage variation in the calutron source voltage through the bleeder resistors 26 and 27 and the regulator 25. This calutron ion source voltage variation produces a proportional variation in the ion beam trajectory thus sweeping another ion beam across the collector pocket as set forth above. The vertical deflecting coils 320 of the cathode ray tube 300 are energized by the current from the calutron collector and thus the presence of a peak in the trace on the fluorescent screen of the cathode ray tube indicates a beam of ions entering the receiver at the particular ion accelerating voltage equal to the original constant ion accelerating voltage plus the portion of the sweep necessary to sweep the trace from its starting point to the peak.

In order to clarify the description of the operation of the interpolator circuit which is set forth in detail below, it is to be noted that the circuit is connected across a voltage divider comprising resistors 28, 29, and 30, as shown in Fig. 1. The voltage divider is connected in series with bleeder resistors 26 and 27 between the high voltage accelerating voltage and point A which is at substantially ground potential and thus the entire accelerating voltage appears across this series combination of bleeder resistance and voltage divider. The ratio of the resistance of the voltage divider to that of the bleeder resistance is chosen so that the voltage drop across the voltage divider is the exact amount that the accelerating voltage is to be changed, as previously determined. The value of the individual resistances of the voltage divider are then chosen so that the voltage drop across the middle resistor 29 is equal to a desired voltage spread about the potential that focuses the indicator ion beam at the receiver. Thus the input signals to the interpolator are directly proportional to predetermined fractions of the sweep voltage.

Considering now the operation of the present invention in more detail, and referring to the sweep circuit depicted in Fig. 2, it will be noted that point $A^2$ is essentially at ground potential due to the fact that diode vacuum tube 51 is normally conducting, thus condenser 56 charges to the potential of the power supply 57, which has a value of 1100 volts in this particular embodiment. The power supply 66 impresses a negative potential of 400 volts on the grid 63 of vacuum tube 61 thus making said tube normally nonconducting. However depressing the push button 68 applies a 350 volt positive potential from power supply 67 to the grid 63 of tube 61 and thus actuates the sweep. In this particular embodiment wherein the above mentioned potentials are employed, resistance 69 is twice the value of resistance 70 and thus there is applied a positive potential of 100 volts to the grid 63 of tube 61. Due to this positive potential applied to its grid 63, tube 61 conducts heavily, thereby placing point F at substantially ground potential and thus charging condenser 56 and point $A^2$ to a negative potential of the order of 1100 volts. When the push button 68 is released tube 61 remains conductive for a short period of time due to the positive charge acquired by the condenser 71 during the period the push button 68 was depressed, said period being determined by the time constant of condenser 71 and resistances 69 and 70.

It will be appreciated that the regulator 25 is influenced by the sweep voltage in such a manner that the change in ion source voltage is almost exactly equal to the voltage variations at point A, both in magnitude and phase; however, as the regulator 25 is of a conventional design well known in the art no detailed description of its construction is presented herein.

When tube 61 again becomes nonconducting the negative charge at $A^2$ is dissipated by the positive current through the voltage dividers and bleeder resistors. Point $A^2$, and consequently condenser 56, would then tend to charge positively were it not for tube 51 which conducts when point $A^2$ tends to assume a positive potential with respect to ground. At this time the grid 63 of tube 61 is negatively charged thus making tube 61 nonconducting and the sweep cycle is complete with point F again assuming a positive charge from the high voltage power supply 57. It is important to note at this time that the rate of rise of voltage at point $A^2$ is substantially constant over the time interval involved in the sweep as a result of the large time constant of condenser 56 and resistances 26, 27, 28, 29 and 30, and the fact that the potential to which condenser 56 is charged is quite small compared to the regulator output voltage.

Considering now the operation of the amplifier circuit as depicted in Fig. 3, it is to be noted that the amplifier serves to convert the voltage variations at point A to current variations of the same waveform and of sufficient magnitude to properly energize the horizontal deflecting coils 320 of the cathode ray tube 300. The sweep circuit signal is applied at point P in Fig. 3 and impressed on the grid 104 of triode vacuum tube 102. A direct coupling network, resistances 107, 121 and 122 establish the operating bias for the twin triode vacuum tube 114, meanwhile allowing direct current transmission from tube 102 to 114. The horizontal deflection coils are connected across points R and S and are thus energized by the current to the cathodes 116 and 117 of tube 114. In order to neutralize the leakage inductance of the deflecting coils 320 inverse feedback stabilization is utilized via resistor 127. Thus any increase in the impedance of the coils with frequency would tend to decrease the current flowing through tube 114 and the current flowing through resistor 127. Thus the voltage fed back to tube 102 is decreased and the output of tube 114 increases to compensate for the original coil impedance change. It is to be noted that a positive potential is applied to the grid 104 of tube 102 through resistances 126 and 129 in order to start the trace from one side of the screen.

Further consideration of circuit operation reveals the intensity grid 315 of the cathode ray tube 300 to be controlled by the interpolator circuit 200 which is depicted in some detail in Fig. 4. In conjunction with the description of Fig. 4 presented below references are made to Fig. 5 in order to clarify the times referred to in this description. Before the sweep is actuated point A' is at ground potential as hereinabove disclosed, said condition resulting in tube 247 passing current thereby placing a negative potential on the intensity grid 315 and thus blanking the trace. At this time points B', C' and D' are 2.5, 3.5 and 6 mass units of potential positive with respect to ground. Thus tubes 223, 238 and 247 are conducting but have only a few volts of positive potential on their grids due to the high resistances 221, 236 and 244. Upon actuating the sweep (T on Fig. 5), point A' immediately goes to more than six mass units of potential negative with respect to ground and the other points B', C' and D' are at lesser negative potentials with respect to ground. Thus tube 247 becomes nonconducting and the intensity grid 315 would ordinarily become positive were it not for the action of tubes 203 and 209. The negative voltage from point D' is transmitted through condenser 201 to the grid 202 of tube 203. This causes the plate 206 to become positive, thereby supplying a positive pulse through the neon coupling tube 207 to the grid 208 of tube 209. The plate 216 of tube 209 then becomes negative and consequently applies a negative potential to the intensity grid 315 thus blanking the trace. The intensity grid 315 remains negative for a short period of time determined by the time constant of condenser 201 and resistance 204. It is to be noted that this particular portion of the interpolator circuit, including tubes 203, 209 and associate circuit elements, may be designed as a "blanking network" as it develops a negative potential on the intensity grid 315 as a result of any sparking or transient conditions at the ion source, thus eliminating undesirable spurious traces and protecting the screen from damage due to such traces.

At a certain time (T₁) from the initiation of the sweep, point D' reaches ground potential, at which time A' is exactly six mass units of potential negative with respect to ground. As a result of this potential at point D', tube 256 becomes conducting thereby making its plate 259 negative. A negative signal from this plate 259 is applied through the neon coupling tube 261 to the grid 246 of tube 247 which in turn places a positive potential on the intensity grid 315, thereby allowing a trace of normal brilliancy to appear on the fluorescent screen. This trace persists until time T₂ when point C reaches ground potential and vacuum tube 223 becomes conducting due to the ground potential appearing on its grid 222. The plate 226 of tube 223 then becomes negative placing a negative signal on the grid 228 of tube 229 which in turn places a positive signal on the intensity grid 315. Thus at time T₂, when point C' reaches ground potential there is an additional positive signal applied to the intensity grid 315 thereby greatly intensifying the trace, said condition lasting until time T₃ when point B' reaches ground potential. Upon B' reaching ground potential tube 238 becomes conducting and applies a negative signal from its plate 241 to the intensity grid 315 thereby canceling the additional positive potential applied to the grid 315 at time T₂, returning the trace intensity to normal. At time T₄ as point A' attains ground potential tube 247 passes a negative signal from its plate 251 to the intensity grid 315 thereby blanking the trace and completing the sweep cycle.

The foregoing disclosure has depicted the invention in only one specific embodiment, however, as will appear obvious to those skilled in the art, many modifications are possible within the spirit and scope of the invention and thus the invention is not to be limited to the details shown except as may be defined in the following claims.

What is claimed is:

1. An ion beam analyzer for use with an electromagnetic mass separator having a power source energizing ion accelerating electrodes thereof and ion receiver means, said ion beam analyzer including a number of series resistors electrically connected between said ion accelerating electrodes and a point A, means to momentarily vary the potential of point A, a cathode ray tube having an intensity control electrode, a fluorescent screen and two pairs of deflecting coils, said pairs of coils having an angular disposition of ninety degrees with respect to each other, means connecting one pair of said deflecting coils to said ion receiver and the other pair of said coils to said point A whereby there is depicted as a trace upon said screen the ion receiver current as a function of said potential variation at point A, and an electronic circuit electrically connected between said series resistors and said cathode ray tube intensity control electrode, said electronic circuit being responsive to the potential of said series resistors whereby the intensity of the trace upon said fluorescent screen is influenced in accordance with the trajectory of said ion beam.

2. In conjunction with an electromagnetic separator having an ion source and receiver and an ion beam therebetween, an ion beam analyzer comprising in combination a cathode ray tube having a fluorescent screen and an intensity electrode, a sweep circuit adapted to vary the trajectory of said ion beam and to influence said cathode ray tube in synchronism therewith, electrical means further influencing said cathode ray tube in accordance with the electrical current from said receiver, and an interpolator circuit including a plurality of electron tubes electrically connected to said cathode ray tube intensity electrode and interposed between said sweep circuit and said ion source, said electron tubes being individually responsive to particular values of the sweep circuit output potential for selectively energizing said intensity control electrode in accordance therewith, whereby the potential applied to said intensity electrode is a function of the trajectory of said ion beam.

3. An ion beam analyzer for use with an electromagnetic separator having an ion source and receiver and an ion beam therebetween; said ion beam analyzer comprising a sweep circuit, a number of resistors of predetermined sizes electrically connected in series between said sweep circuit and said ion source, a cathode ray tube having an intensity control electrode, a long-persistence fluorescent screen, and horizontal and vertical deflection coils, means electrically connecting said sweep circuit to said horizontal coil, and means electrically connecting said receiver to said vertical deflection coil; an interpolator circuit including a plurality of vacuum tubes each having control means and means connecting the junctures of said resistors to the control means of individual vacuum tubes whereby the output of said interpolator circuit is a function of the voltage of the junctures of said individual resistors; and means impressing the output of said interpolator circuit upon the intensity control electrode of said cathode ray tube whereby the intensity of the trace upon said fluorescent screen varies in a predetermined manner.

4. An ion beam analyzer for use with an electromagnetic separator having an ion source, an ion receiver, an ion accelerating electrode cooperating with said ion source and potential supply means maintaining said ion source at a positive potential with respect to said accelerating electrode whereby ions from said source are projected therefrom in the form of a beam; said analyzer comprising in combination a number of resistors electrically connected in series with one end of said series joined to said ion source, potential variation means cooperating with the other end of said series of resistors whereby the potential of said ion source is varied and consequently the trajectory of said ion beam is varied, indicating means associated with said receiver and said potential variation means whereby properties of said ion beam are visually depicted, and further means including potential responsive means electrically connected across individual elements of said series of resistors for control by the potentials thereof and connected to said indicating means to apply thereto a signal in accordance with the potentials across said resistors whereby said indicating means is provided with indicia as to the relative position of said ion beam with respect to said receiver.

5. An ion beam analyzer associated with an electromagnetic mass separator having an ion receiver and ion accelerating means, said ion beam analyzer including a cathode ray tube connected to said ion receiver for indicating the current thereto and having an intensity control electrode, a resistor connected at one end to said ion accelerating means, means for causing a current to flow through said resistor, means for varying the potential of the other end of said resistor, and means responsive to the potentials of a number of points along said resistor for applying a signal to said intensity control electrode.

6. An ion beam analyzer comprising a cathode ray tube having an electron source, means forming a beam of the electrons at said source, a long-persistence fluorescent screen, means to sweep said electron beam across said screen, means to vary the position of said beam perpendicularly to the direction of said sweep as a function of an electrical signal exterior to said tube, and a control electrode influencing the intensity of said beam; an interpolator circuit including variable impedance means having control means electrically connected to receive said external electrical signal, and potential supply means connected in parallel with said variable impedance means to said intensity control electrode, thereby influencing the potential of said control electrode in accordance with predetermined values of said electrical signal whereby visual orienting indicia are provided upon said fluorescent screen.

7. In an ion beam analyzer for an electromagnetic mass separator including a cathode ray tube having an intensity control electrode and being connected to depict ion beam current at the receiver, and a sweep circuit connected to said cathode ray tube and to the ion accelerating means of the mass separator, the combination comprising; a plurality of resistors of predetermined value connected in series between the sweep circuit and ion accelerating means, a power supply connected to the intensity control electrode of the cathode ray tube, and a plurality of vacuum tubes having control means, said vacuum tubes being connected in parallel across said potential supply source, and said control means being connected to the junctures of said resistors whereby the intensity control electrode of the cathode ray tube is energized in response to the instantaneous potential of the junctures of said resistors.

8. An ion beam analyzer measuring the ion separation in an electromagnetic mass separator having ion accelerating means and ion receiving means, said analyzer comprising a sweep circuit for producing a voltage pulse having a rapid rise time and linear decay, means connecting said sweep circuit to said ion accelerating means, a cathode ray tube having electron beam deflecting means, electron beam intensity control means, and a fluorescent screen having a trace thereon, said electron beam deflecting means being connected to said sweep circuit and said ion receiving means to define said trace thereby, and an electron circuit connected to said sweep circuit and including potential responsive means responsive to particular values of said sweep circuit output potential and potential supply means controlled by said potential responsive means and connected to the intensity control means of said cathode ray tube whereby the intensity of the trace upon the fluorescent screen of said cathode ray tube is controlled by particular values of said sweep circuit output potential.

9. In combination with an ion beam analyzer including a cathode ray tube having an intensity control electrode for measuring the ion trajectory in an electromagnetic mass separator having ion accelerating and separating means; an electrical blanking circuit including a normally conducting first vacuum tube having an anode and control electrode, a resistance-capacitance network coupling the control electrode of said first vacuum tube to said ion accelerating means, and a normally non-conducting second vacuum tube having an anode and control electrode, the control electrode of said second tube being coupled to the anode of said first tube and the anode of said second tube being connected to the intensity control electrode of said cathode ray tube whereby the intensity control electrode of said cathode ray tube is energized negatively for a period determined by the time constant of said resistance-capacitance network when said ion accelerating means becomes negative, thereby protecting said cathode ray tube from damage due to large voltage variations of said ion accelerating means.

References Cited in the file of this patent

UNITED STATES PATENTS

| | | |
|---|---|---|
| 2,243,234 | Von Duhn | May 27, 1941 |
| 2,331,189 | Hipple | Oct. 5, 1943 |
| 2,416,088 | Deerhake | Feb. 18, 1947 |
| 2,440,786 | Schade | May 4, 1948 |

FOREIGN PATENTS

| | | |
|---|---|---|
| 594,382 | Great Britain | June 29, 1945 |